Patented July 10, 1945

2,380,122

UNITED STATES PATENT OFFICE 2,380,122

MONOAZO DYESTUFFS

Jakob Scheidegger, Basel, Switzerland, assignor to Society of Chemical Industry in Basle, Basel, Switzerland, a Swiss company No Drawing. Application April 20, 1942, Serial No. 439,769. In Switzerland April 25, 1941

2 Claims. (Cl. 260—198)

It has been found that new azo-dyestuffs possessing very good levelling properties and yielding dyeings on wool which are remarkable for their good fastness to light and their excellent fastness to perspiration are obtained if diazo compounds of sulfones of the general formula $$R_1-SO_2-R_2,$$

in which $R_1$ and $R_2$ represent aromatic nuclei of the benzene series, one of which carries an amino group in the meta position to the $SO_2$-group, are united with 2-amino-8-hydroxynaphthalene-6-sulfonic acid in an acid medium.

The sulfones of the general formula defined above are prepared by methods of themselves known, for example by the action of metanitrosulfochlorides of the benzene series on hydrocarbons of the benzene series or on their substitution products, the condensation reactions taking place after the manner of the Friedel and Kraft's reaction, and subsequent reduction of the products obtained. Such sulfones are, for example, 3-amino-1:1'-diphenyl sulfone, 3-amino-4-chloro-1:1'- diphenyl sulfone, 3-amino-4'-chloro- or -4'-methyl-1:1'-diphenyl sulfone, 3-amino-4-methyl - 1:1' - diphenyl sulfone, 3 - amino-4'-methoxy-4-chloro-1:1'-diphenyl sulfone, 3-amino-4'-methoxy-4-bromo-1:1'-diphenyl sulfone, 3 - amino-4'-methyl-4-chloro - diphenyl sulfone, etc.

The new dyestuffs thus correspond to the general formula

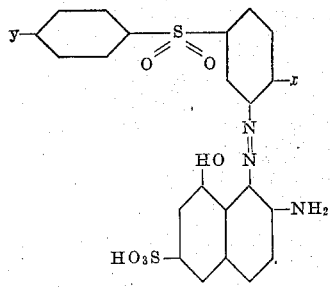

in which the positions marked $y$ and $x$ in the benzene nuclei can be further substituted, for example, by halogen atoms, methyl or even alkoxy groups. Those products are especially valuable in which a halogen atom, such as a chlorine or a bromine atom, is present in the above compounds in the para-position to the $SO_2$-group and in the ortho-position to the azo-group, that is in the position denoted by $x$ in the above formula.

The following examples illustrate the invention, the parts being by weight:

Example 1

26.75 parts of 3-amino-4-chloro-1:1'-diphenyl sulfone are diazotized by introducing them into a solution of nitrosyl-sulfuric acid, prepared from 6.9 parts of sodium nitrite and sulfuric acid. The diazo solution is poured on to ice and is added to a solution of 23.9 parts of 2-amino-8-hydroxynaphthalene-6-sulfonic acid. After complete coupling has taken place, the dyestuff is isolated and dried.

The new dystuff corresponds to the formula

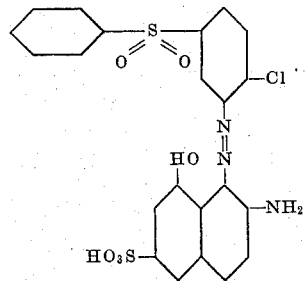

and dyes wool in red shades of very good fastness to light and of excellent fastness to perspiration.

Example 2

2.5 parts of the dyestuff obtained in the above example are dissolved in 1000 parts of water by boiling. The dyebath is made up to 2500 parts of 50–60° C., to which is added the dyestuff solution already prepared, the container being rinsed with a further 500 parts of water, which is also added to the bath. To this dyebath, which now consists of 4000 parts, 10 parts of crystalline sodium sulfate are added. 100 parts of wool are entered into the bath at 50–60° C. and an addition of 40 parts of sulfuric acid of 10 per cent. strength is made. The temperature of the bath is raised slowly to 85–90° C. and dyeing is continued for 1 hour at this temperature. The dyeing is then finished in the usual manner. A very pure red shade is obtained which possesses excellent fastness properties.

What I claim is:

1. Dyestuffs which, in the free state, correspond to the general formula

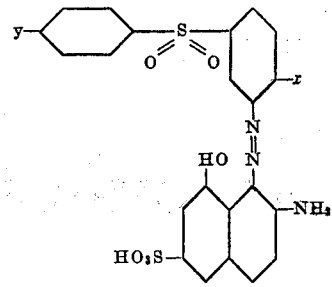

in which the position denoted by $x$ is occupied by a member selected from the group consisting of chlorine and bromine and the position denoted by $y$ is occupied by a member selected from the group consisting of H and methyl.

2. The dyestuff which, in the free state, corresponds to the formula

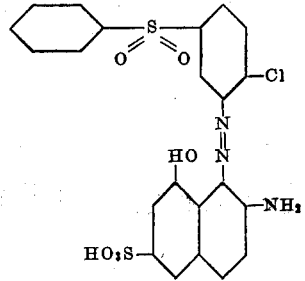

JAKOB SCHEIDEGGER.